No. 686,387. Patented Nov. 12, 1901.
W. G. COGSWELL.
BOILER FLUE PLUG.
(Application filed Feb. 13, 1901.)
(No Model.)
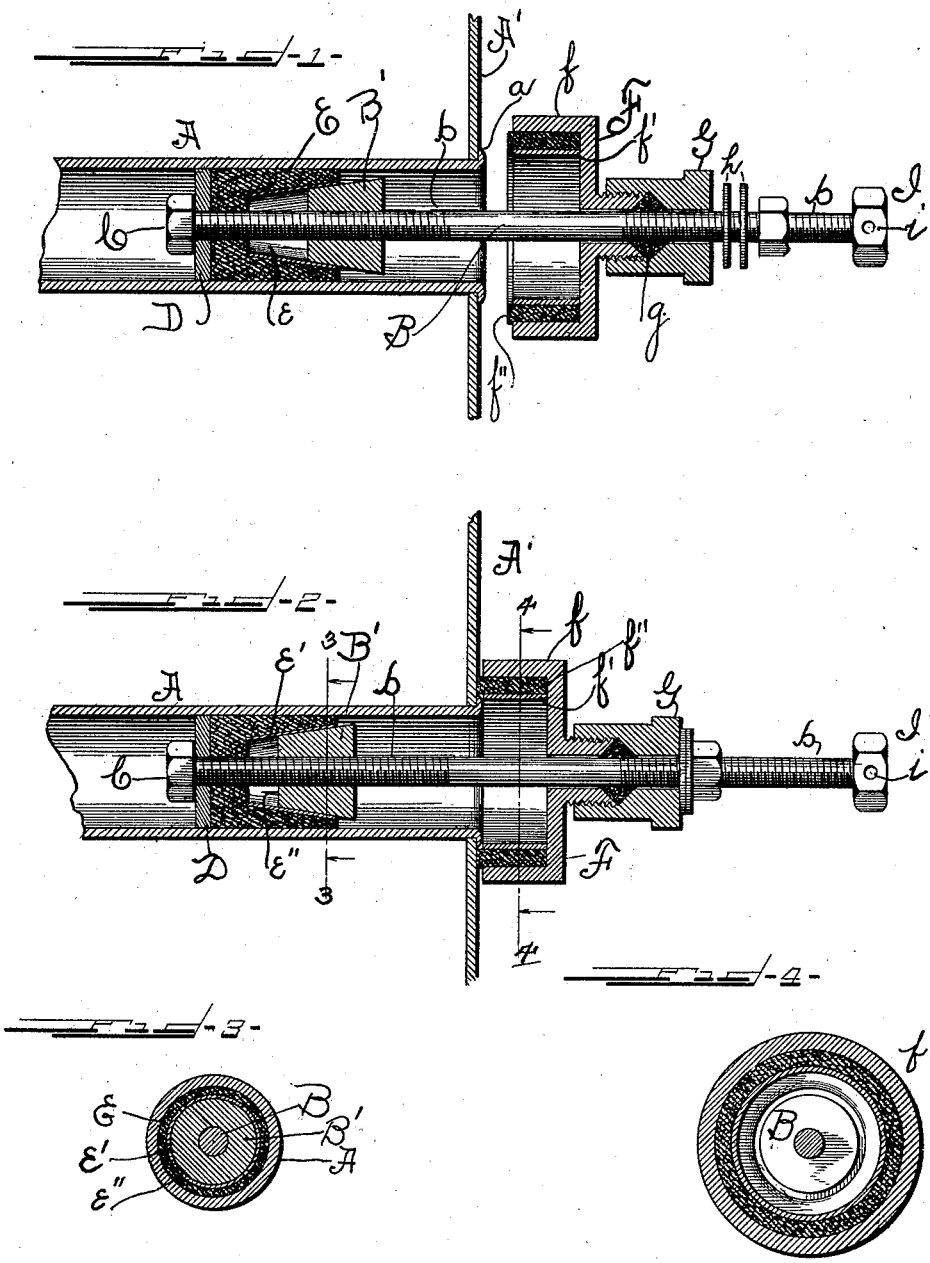

UNITED STATES PATENT OFFICE.

WILFRED G. COGSWELL, OF COOK COUNTY, ILLINOIS, ASSIGNOR OF TWO-FIFTHS TO PAUL I. WELLS AND ALBERT W. SPRAGUE, OF HAMMOND, INDIANA.

BOILER-FLUE PLUG.

SPECIFICATION forming part of Letters Patent No. 686,387, dated November 12, 1901.

Application filed February 13, 1901. Serial No. 47,116. (No model.)

*To all whom it may concern:*

Be it known that I, WILFRED G. COGSWELL, a citizen of the United States of America, and a resident of the county of Cook, in the State of Illinois, have invented certain new and useful Improvements in Boiler-Flue Repairs, of which the following is a specification.

My invention relates to repairs for boiler-flues; and the object thereof is to provide a sufficient and quickly-applied means by which leaks in the flues of boilers may be stopped without requiring a long shut-down of engine or plant until such time as permanent repairs conveniently can be made. With few exceptions the leaks in steam-boilers in and in connection with the flues occur just within the line of the boiler-head through the material of the flue or under the bead where the end of the flue is turned over and down upon the head. In the former case it usually arises from too great expansion of the flue, which causes the same to be weakened, and in the latter case by insufficient expansion of the flues or imperfect beadings or by subsequent expansion and contraction of the boiler itself in service. In either case the location of the leak is within a very limited area, which is comprehended between the edge of the bead and a short space from the end of the flue.

My invention provides means by which a plug is inserted and made steam-tight within the flue at a distance beyond any probable rupture of the flue, and a cap having packed or gasketed edges is placed over the end of the flue, so as to rest against the boiler-head, the whole being operated and secured together by proper adjustments and attachments.

My invention is hereinafter fully described with reference to the drawings, in which—

Figure 1 represents a longitudinal section of my device in position ready for application. Fig. 2 is a similar view after the application is made. Fig. 3 is a cross-section on the line 3 3. Fig. 4 is a cross-section on the line 4 4.

Referring further to the drawings, in which like letters of reference denote like parts throughout, A represents a detached portion of the boiler-flue, A' a portion of the boiler-head, and $a$ the bead of the flue bearing on the head.

B is a stem or rod threaded at $b$ and $b'$. A stationary head or nut C is secured to the end of the stem B, so as to support the washer D, which is slightly smaller than the diameter of the flue and which turns freely on the stem. An elastic and somewhat-expansible packing-plug E, which may be of rubber or, in common with the other packings hereinafter described, may be of asbestos or some similar material, of such external diameter as to fit snugly within the flue, surrounds the stem B, and one end rests upon and is supported by the washer D. The plug E is cored from the other end, so as to leave an opening $e$ in the form of a truncated cone. Screwed upon the stem B at that portion represented by $b$ is an internally-threaded expander B' in the form of a truncated cone whose sides have the same inclination as the sides of the opening $e$ and whose mean diameter is slightly larger than the largest diameter of the opening $e$. A metallic thimble $e'$, having slots $e''$, forms a lining for the opening $e$ and provides a bearing for the expander B', upon which it will move readily and with less friction than if its bearing were directly on the material of the packing-plug.

F is a cap having an external flange $f$ and an internal flange $f'$, whose internal diameter is slightly greater than the external diameter of the flue-bead. The space between the flanges is filled with a packing $f''$. The rod or stem B passes centrally through the cap F, and to insure against the escape of water or steam a stuffing-box in the form shown, comprising the follower G and the packing $g$, or any other desired pattern is provided. A nut H is screwed on the threaded portion $b'$ of the stem, and washers $h$ may be interposed between the same and the follower G of the stuffing-box. The stem B at the end external to the flue terminates in the head I with the transverse opening $i$, into which a tool may be inserted for turning the stem to screw the expander-plug into the expansible plug surrounding it.

The operation of my device is as follows: When a leak is discovered, it may be closed by inserting the packing-plug within the flue, the expander B' being withdrawn from the plug by the right-handed motion of the stem until it assumes the position shown in Fig. 1. A left-handed motion of the stem B, which may be made with great force by a wrench applied to the head I, forces the expander B' into the packing-plug until it takes the position shown in Fig. 2, in which the latter becomes steam and water tight and forms in connection with the adjacent portions of the device a secure anchorage for the stem for the subsequent operation. The cap F is then slid down on the stem until the edges of the packing f'' rest upon the boiler-head and surround the flue-bead. The nut H, with the interposed washers h, is then screwed down upon the follower G, forcing the cap F and its flange-inclosed packing into close annular contact with the boiler-head, so as to make a steam and water tight joint for the flue end. When the apparatus is thus secured, further leaking beyond the cap-inclosed space is prevented, and the boiler may be retained in service until such time as permanent repairs can be conveniently and economically made. The apparatus may then be laid aside until other similar emergencies may arise.

Having thus described my device, I claim, and desire to secure by Letters Patent, the following:

1. In a boiler-flue repair, a flue-cap anchorage comprising a supporting-stem, an elastic expansible plug mounted on the stem and an expander screw-threaded to said stem, substantially as shown and described.

2. In a boiler-flue repair, a flue-cap anchorage comprising a supporting-stem, an elastic expansible plug with truncated cone-shaped opening mounted on the stem, and a truncated cone-shaped expander screw-threaded to the said stem and adapted to be forced into the opening in the plug, substantially as shown and described.

3. In a boiler-flue repair having an anchorage adapted to be secured to the interior of the flue and a stem secured thereto, a cap adapted to rest against the boiler-head so as to cover and surround the end of the flue, and means for forcing said cap against the boiler-head, substantially as shown and described.

4. In a boiler-flue repair, an expansible anchorage adapted to fit the interior of the flue, means for expanding said anchorage, a cap adapted to rest against the boiler-head so as to fit over and inclose the flue end, and means for securing the same to the anchorage, substantially as shown and described.

5. In a boiler-repair, a stem, an expansible anchorage on the stem, means for expanding the anchorage, a cap mounted on said stem adapted to rest against the boiler-head so as to cover and inclose the end of the boiler-flue, and means on said stem to secure the cap to the anchorage, substantially as shown and described.

6. In a boiler-flue repair, the combination of a stem, an elastic plug having a sloping opening revolubly mounted on said stem, an expander with sloping sides on said stem, the said stem and expander being respectively externally and internally threaded, a cap for the flue provided with a stuffing-box through which the stem passes, means for turning the stem to screw the expander into the plug, and a nut on the stem to set the cap against the boiler-head, substantially as shown and described.

7. In a boiler-flue repair, an expansible anchorage seatable in the flue, a stem attached thereto, a cap adapted to inclose the end of the flue, and means on the stem for securing the cap to the anchorage and against the boiler-head, substantially as set forth.

8. In a boiler-flue repair, an expansible anchorage seatable in the flue, a cap adapted to inclose the end of the flue so that its edges rest against the boiler-head, and means for securing the cap to the anchorage when seated in the flue, substantially as set forth.

9. In a boiler-flue repair, an elastic plug with cone-shaped opening, a screw-threaded stem passing therethrough and provided with a supporting-head, a cone-shaped expander screwed on said stem, an external cap through which the stem passes whose edges are adapted to surround the flue and seat on the boiler-head, and means on said stem for securing said cap to the anchorage and against the boiler-head, substantially as set forth.

Signed at Chicago, Illinois, this 9th day of February, 1901.

WILFRED G. COGSWELL.

Witnesses:
C. K. CHAMBERLAIN,
A. S. PHILLIPS.